United States Patent [19]

Osgood, Sr.

[11] Patent Number: 4,466,259

[45] Date of Patent: Aug. 21, 1984

[54] ADJUSTABLY POSITIONABLE LOCKING DEVICE FOR TANK CAPS

[76] Inventor: Gordon L. Osgood, Sr., 61407 Spring Circle Trail, Romeo, Mich. 48065

[21] Appl. No.: 408,463

[22] Filed: Aug. 16, 1982

[51] Int. Cl.³ .............................................. B65D 55/14
[52] U.S. Cl. .......................................... 70/164; 70/19
[58] Field of Search ................... 70/19, 163, 164, 165, 70/166, 167, 168

[56] References Cited

U.S. PATENT DOCUMENTS 3,206,955  9/1965  Horovitz ................................ 70/163
3,756,047  9/1973  Mulberry ............................... 70/164
4,362,036  12/1982  Shanklin ................................ 70/167

FOREIGN PATENT DOCUMENTS 2948558  7/1981  Fed. Rep. of Germany ........ 70/164
 489155  7/1938  United Kingdom .................... 70/19

Primary Examiner—Robert L. Wolfe
Attorney, Agent, or Firm—James & Franklin

[57] ABSTRACT

A locking device for locking a cap upon the filling neck of a tank permits the protective cup-like member of the locking device to be axially offset from the tank cap to enable the locking device to accommodate itself to the restricted compartment available about the tank neck. The locking device comprises a cup-like cylindrical body member and a pair of inwardly extending collar parts, the body member and collar parts being cooperable with a lock for securing the body member and collar parts against movement. The collar parts are independently pivotally secured to the body member at one end thereof with the opposite ends of the collar parts being apertured and movable relative to the other collar part and the body member in the absence of the lock.

8 Claims, 10 Drawing Figures

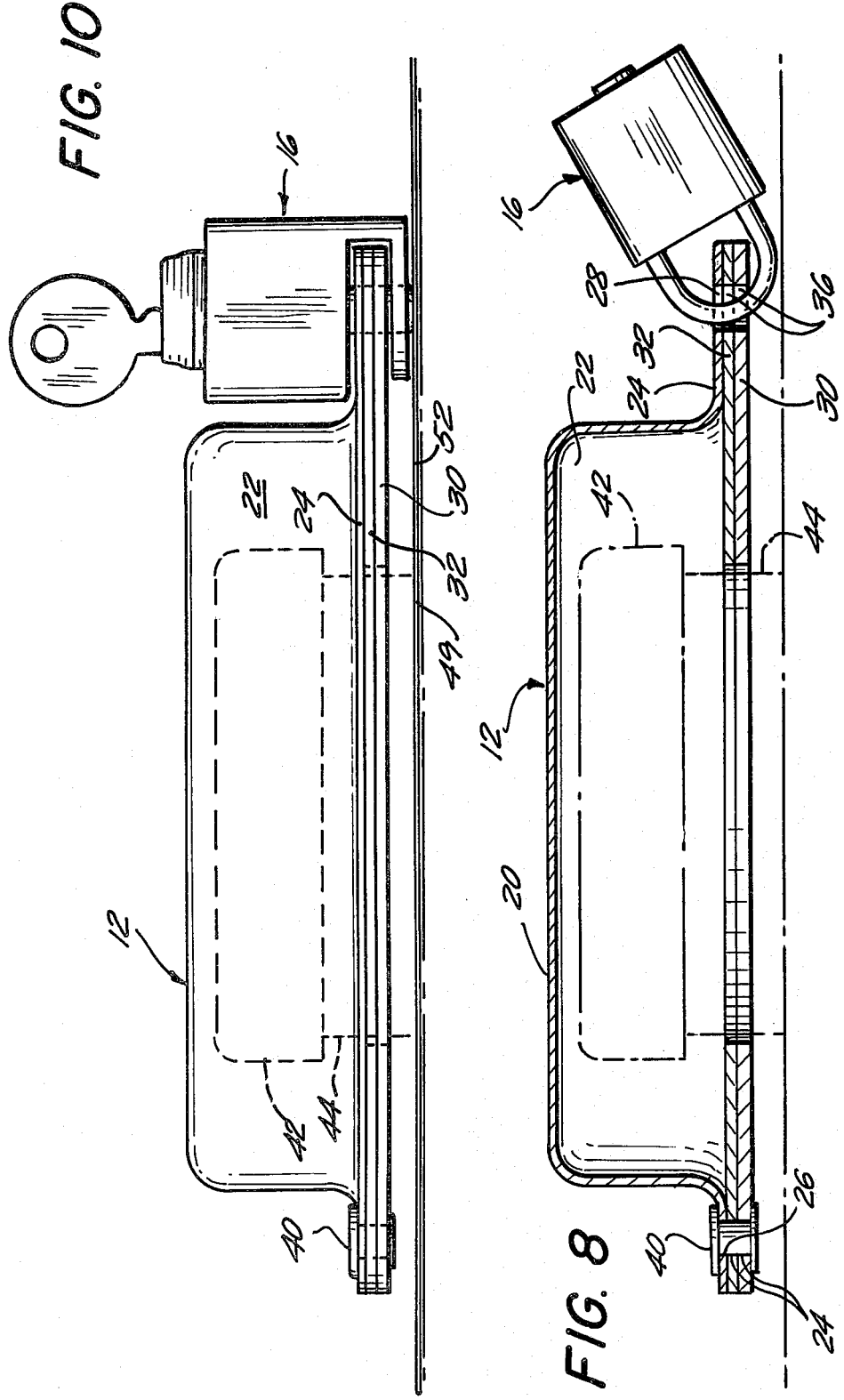

ADJUSTABLY POSITIONABLE LOCKING DEVICE FOR TANK CAPS

BACKGROUND OF THE INVENTION

The present invention relates to a locking device for locking caps upon the necks of tanks, the primary use being for securing the caps of motor vehicle gas tanks in place to prevent the theft of fuel.

U.S. Pat. No. 3,756,047 issued Sept. 4, 1973 discloses a locking device consisting of a cylindrical body member having a cup-like form and terminating in a two-part inwardly extending collar. The device is designed so that the inwardly extending collar portion may bypass the tank cap as the device is installed or removed and yet be locked so as to prevent installation or removal. The two inwardly extending collar members are disposed in overlaying relationship and held together on one end by means of a rivet so as to render one collar member pivotally movable. The other collar member is permanently fastened into a recess of the body member. Both collar members have on their opposite or unriveted ends apertures which, when aligned in registration, permit passage therethrough of the shackle of a suitable locking mechanism. With the device in locked position upon the cap and about the filling neck of a tank, the shackle of the locking mechanism passes through the registering apertures and prevents the locked device from being removed by an unauthorized person.

In the patented locking device, the cup-like body member is held by the collar members more or less directly over and in alignment with the neck of the tank. In many motor vehicles, however, the neck of the gas tank extends into a cramped, highly restricted area only slightly larger than the minimum required to receive the tank cap. However, as the tank cap must be rotated when it is being affixed to the tank neck, there is usually room about at least three quarters of the tank cap for a hand, although the other quarter of the tank cap may be almost flush against the compartment wall when the tank cap is in place. While the pivotal member of the patented device includes a pair of apertures on the opposite or unriveted end, the effect of the pair of apertures is to enable the collar members to be snugly fit upon tank necks of different size and not for the effect of enabling the axis of the cup-like member to be displaced with respect to the axis of the tank neck or caps. If one utilized the aperture giving the collar members the loosest fit rather than the one giving them the tightest fit, the entire locking device would have fit loosely on the tank cap, thus promoting the chance of a spark being formed in an area where sparks are to be assiduously avoided, or, worse, been removable from the tank neck. Thus there remains the need for a locking device which can accommodate itself to the cramped compartments typically available about tank necks and caps.

Accordingly, it is an object of the present invention to provide a locking device wherein the cup-like body member may be seated upon a tank neck or cap with the cup-like body member being axially offset from the tank neck or cap.

Another object is to provide a simple, strong, safe and inexpensive locking device which is efficient, long lasting and easy to operate.

SUMMARY OF THE INVENTION

It has now been found that the above and related objects of the present invention are obtained in a locking device for locking a cap upon the filling neck of a tank comprising a cup-like, generally cylindrical body member and a pair of inwardly extending collar parts. The ends of the collar parts are disposed in an overlaying relationship, one end of each of the collar parts being independently pivotably secured to a peripheral portion of the body member and the opposite end of each of the collar parts being apertured and movable relative to each other and the body member between enabling and locking positions. The collar parts in the enabling position enable the inwardly extending portions of the collar parts to bypass the tank cap as the device is installed or removed and in the locking position underly the peripheral portion of the tank cap to prevent removal of the device. The body member and the collar parts are cooperable with means for lockably securing the body member and the collar parts against movement. Preferably the body member and collar parts are capable of assuming a first locking position in which the body member and tank cap are axially aligned and a second locking position in which they are out of alignment.

In a preferred embodiment the body member has diametrically opposed first and second peripheral apertures, and each of the collar parts has first and second apertures at the first and second ends thereof, respectively. The locking device further comprises pivot means extending through each of the first apertures of the body member and collar parts to pivotally secure the body member and the collar parts together so that they are rotatable about a common axis. The body member and the second ends of the collar parts are cooperable with the securing means to secure the same against movement by having a shackle portion passing through the second apertures of the body member and collar parts to maintain the collar parts in the locking position.

Preferably the second ends of each of the collar parts define a plurality of second apertures, optimally three, so that when one of the second apertures of each of the second ends is aligned with the body member second aperture, the body member may be axially offset from the tank cap while still covering it.

The locking device may also comprise the securing means described above.

The locking device may further comprise a flexible, fluid-impermeable apron having an aperture therethrough, the apron being adapted to be fitted over the tank neck with the tank neck extending through the apron aperture. A portion of the apron is removably positionable between a storage position adjacent to the tank neck and a protecting position overlying an area remote from the tank neck and requiring protection from the fluid contents of the tank.

BRIEF DESCRIPTION OF THE DRAWING

FIG. 8 is a side elevation view of the locking device (including the securing means) taken along the line 8—8 of FIG. 2;

FIG. 10 is a side elevation view of the locking device (including the securing means) atop a tank neck.

DETAILED DESCRIPTION OF THE PREFERRED EMBODIMENTS

Figure 1:
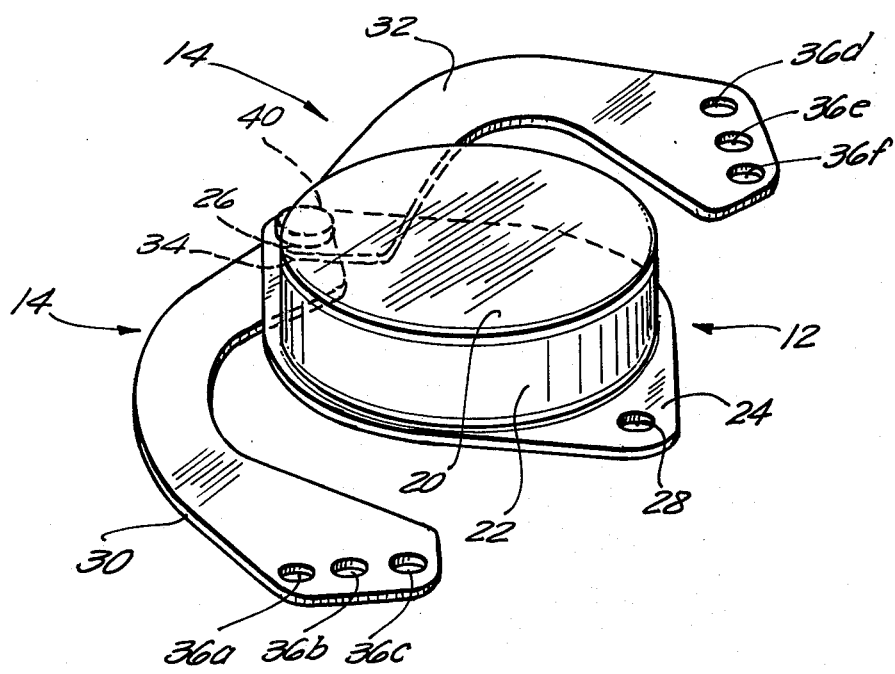
FIG. 1 is an isometric view of a locking device according to the present invention.
Figure 9:
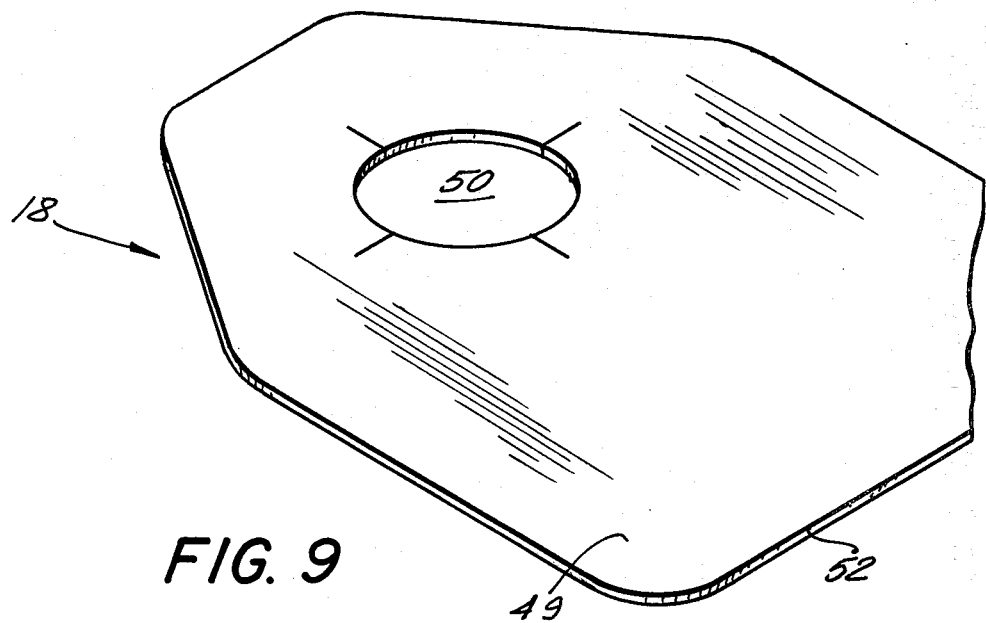
FIG. 9 is an isometric view of the apron of the locking device.

Referring now to FIGS. 1, 9 and 10 in particular, the locking device of the present invention generally comprises a cylindrical cup-like body member generally designated by the numeral 12, a pair of inwardly extending collar parts generally designated by the numeral 14, and, optimally, means 16 for lockably securing the body member and collar parts against movement (see FIG. 10), and/or an apron generally designated by the numeral 18 (see FIG. 9).

Referring now in particular to FIG. 1, the cup-like generally cylindrical body member number 12 comprises a substantially flat circular upper face 20, a sidewall 22 depending from the periphery of the face 20, and a peripheral rim 24 extending outwardly from the bottom of the sidewall 22. The peripheral rim 24 projects outwardly at the front and the rear of the body member 12 so as to provide space for a rear aperture 26 and a generally diametrically opposed front aperture 28 extending vertically through the rear and front rim projections, respectively.

The inwardly extending collar parts 14 comprise a first or a right hand collar part 30 and a second or left hand collar part 32, the ends of the collar parts 30, 32 being disposed in an overlaying relationship. Each of the collar parts 30, 32 has an aperture 34 on the back or rear portion thereof and three apertures 36 on the forward portion thereof. More particularly, the first collar part 30 has in series apertures 36a, 36b and 36c extending vertically therethrough while the collar part 32 has apertures 36d, 36e, and 36f extending vertically therethrough.

A pivot 40 extends through the rear aperture 26 of the body member 12 and the rear apertures 34 of the collar parts 30 and 32 to pivotally secure the body member 12 and collar parts together, allowing each collar part 30, 32 to pivot independently of each other and of the body member 12 about a common axis. As illustrated in FIG. 1, the collar parts 14 are in an enabling position enabling the inwardly extending portions of the collar parts 30, 32 to bypass a tank cap as the locking device is being installed or removed. As illustrated in FIG. 8, the collar parts are in a securing or locking position in which they underlie peripheral portions of the tank cap to prevent removal of the locking device from the tank cap.

Referring now to FIG. 8 in particular, therein illustrated is the locking device with the collar parts 30, 32 in a locking position such that at least inwardly extending portions thereof underly peripheral portions of a tank cap 42 seated upon the neck 44 of a tank (not shown), such as an automobile gas tank. A shackle of the securing means, generally designated by the numeral 16, passes through the front aperture 28 of the body member 12 and at least one front aperture 36 of each collar part 30, 32. The securing means 16 is simply a conventional lock, and any lock will suffice so long as the shackle thereof is appropriately sized to pass through the cooperating front apertures of the body member and collar parts.

It should be appreciated that as long as the locking device is affixed atop the tank cap 42 with the inwardly extending portions of the collar parts 30, 32 underlying at least a peripheral portion of the tank cap 42, the locking device cannot be removed from the tank neck 44 and the tank cap 42 cannot be removed from the tank neck 44 without removal of the locking device.

The body member and collar parts may be formed of any tough material, such as metal or a rigid plastic. The pivot 40 is preferably made of metal for strength and ease of rotation of the locking device parts thereabout.

Figure 2:
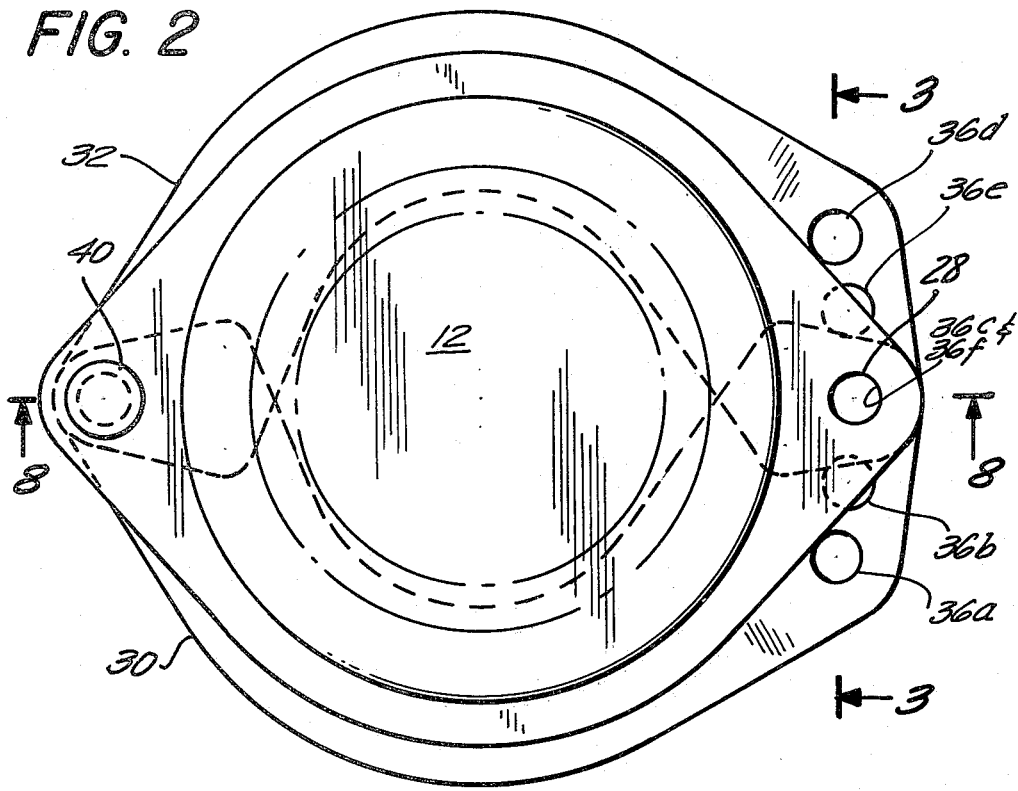
FIG. 2 is a top plan view of the locking device in a first position suitable for use with a wide tank neck.
Figures 3, 5, 7:
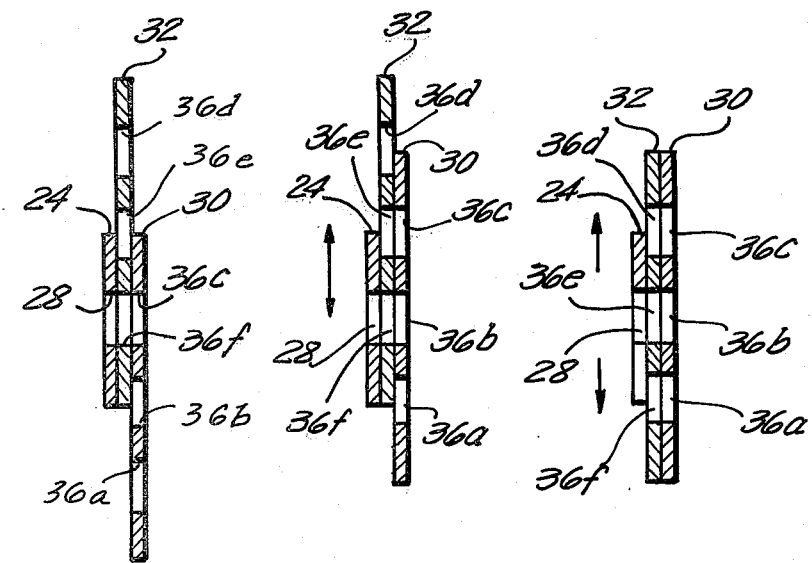
FIG. 3 is a side elevation view, partially in cross section, taken along the line 3—3 of FIG. 2.
FIG. 5 is a side elevation view, partially in cross section, taken along the line 5—5 of FIG. 4.
FIG. 7 is a side elevation view, partially in cross section, taken along the line 7—7 of FIG. 6.

Referring now to FIGS. 2 and 3, therein illustrated is a locking device, as described above, with the collar parts 30, 32 being in a first locking position suitable for use on a wide tank neck 44. In this position the shackle of the locking means 16 extends through the front body member aperture 28, the front aperture 36f of collar part 32 and the front aperture 36c of collar part 30. It will be appreciated that while this first position is suitable for use with a tank neck 44 of extremely large diameter, it does not enable the axis of the body member 12 to be offset from the axis of the tank neck 44 as the front body member aperture 28 cannot be offset to one side or the other of the axis of front collar part apertures 36c ad 36f and still permit a shackle to pass through such apertures to effectively immobilize both collar parts and the body member.

Figure 4:
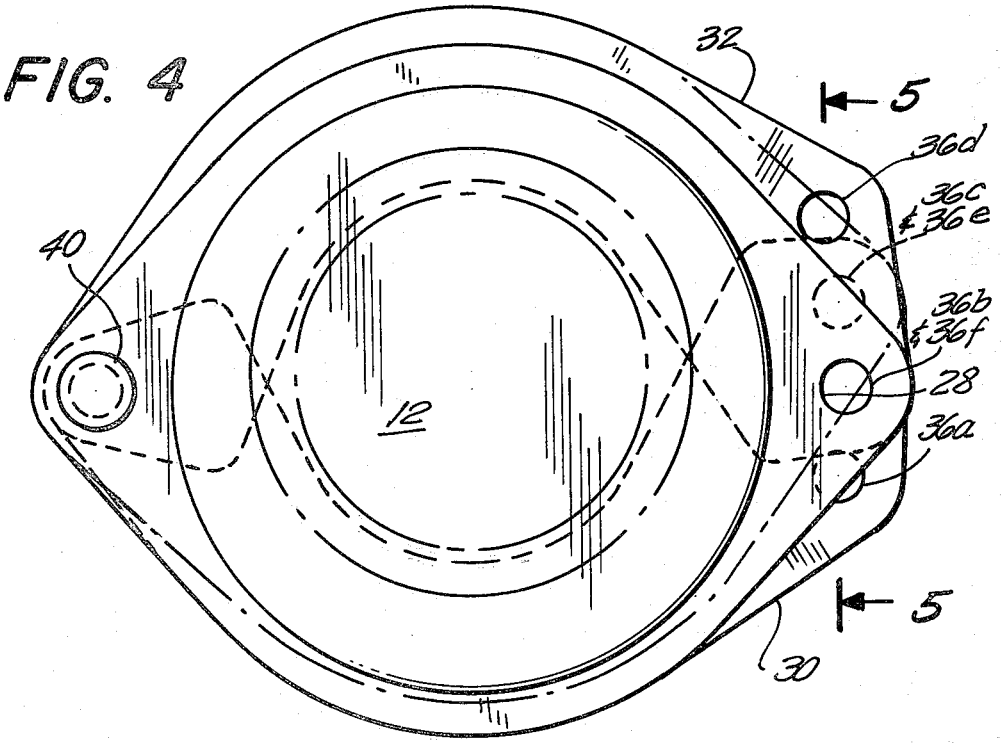
FIG. 4 is a top plan view of the locking device in a second position suitable for use with an intermediate size tank neck, with a third position being shown in phantom line.
Figure 6:
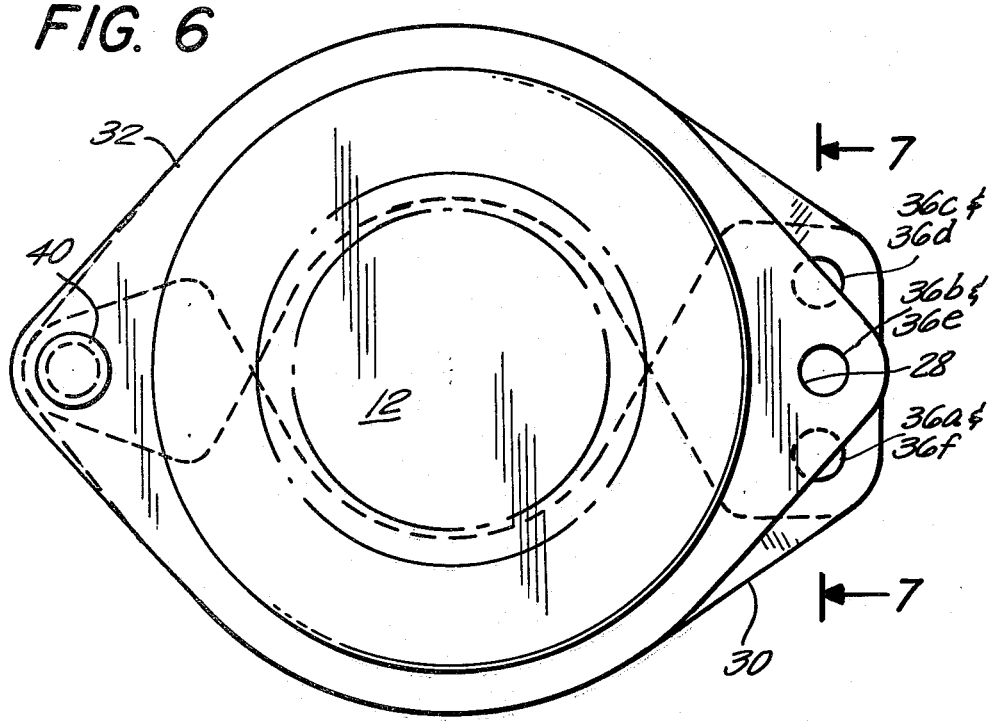
FIG. 6 is a top plan view of the locking device in a fourth position suitable for use with a narrow tank neck.

Referring now to FIGS. 4 and 6, therein illustrated is the locking device with the collar parts in a second locking position suitable for use with a tank neck 44 of intermediate width. Whereas in the first locking position shown in FIGS. 2 and 3, only one pair of collar part front apertures (i.e., 36c and 36f) are aligned, in FIGS. 4 and 5 two pairs of collar part front apertures are (i.e., 36c and 36e, and 36b and 36f). In this configuration, it is not only possible for the axis of the body member 12 to be offset from the axis of the tank neck 44, it is unavoidable. The front body member apertures 28 may be aligned with either the front collar aperture pair 36b, 36f (the second locking position, as shown in solid line) or the front collar part aperture pair 36c, 36e (the third locking position, as shown in dotted line). As the collar parts are symmetrically wrapped around the tank neck 44, the body member axis is necessarily offset from the tank neck axis to one side or the other. In other words, while the body member 12 may be changed from the solid line position of FIG. 4 to the dotted line position thereof simply by moving it in one direction or another (see arrows shown in FIG. 5), in either case it assumes an off-alignment orientation with respect to the tank neck 44 and tank cap 42.

Referring now to FIGS. 6 and 7, therein illustrated is the locking device with the collar parts in the fourth locking position suitable for use with a tank neck 44 of small diameter. In this orientation, the front collar part apertures are all paired off, 36a and 36f, 36b and 36e and 36c and 36d, each pair of collar apertures being in alignment. As illustrated in FIG. 6, the front body member aperture 28 is aligned with the 36b, 36e pair of front collar part apertures. In this orientation, the body member 12 is axially aligned with the tank neck 44 and tank cap 42. However, if desired in order to enable the body member 12 to fit within a cramped space above and adjacent the tank cap and neck, the body member 12 may be displaced to one side or the other (as shown in the arrows of FIG. 7) so as to become aligned with either of the other pair of front collar part apertures, 36c and 36f or 36c and 36d, the body member axis thereby becoming displaced from the tank neck axis in the direction of the movement. For example, if there were not sufficient space for the body member 12 to be symmetrically oriented about the tank neck 44, it might be displaced, as space permitted, to the right or left of the aperture pair 36b and 36e to assume a fifth or sixth locking position, respectively.

To summarize, when the locking device is used on a wide tank neck, there is but one locking position possible—namely, the first locking position in which the body member is axially aligned with the tank neck (see FIGS. 2–3). When the locking device is used on an intermediate size tank neck, there are two locking positions available—namely, the second and third locking positions, in both of which the body member is axially offset from the tank neck (see FIGS. 4–5). When the locking device is used on a narrow tank neck, there are three locking positions available—namely, the fourth, fifth and sixth locking positions (see FIGS. 6–7). In one of these locking positions (the fourth) the body member is axially aligned with the tank neck while in the other two positions (the fifth and sixth) the body member is axially offset from the tank neck. Obviously the collar part members may have any plurality of front collar part apertures disposed thereon, but three front apertures per collar part is a preferred number. The greater the number, the more possible offset positions are available; however, there are competing considerations. For example, in view of the limited space available in the tank neck compartment, the aperture size would have to be decreased (thereby dictating the use of a less sturdy shackle for the locking device 16). Also the degree of offset may begin to impair the protective seating of the body member on the tank cap.

Referring now in particular to FIGS. 9 and 10, therein illustrated is a mat or apron, generally designated by the numeral 18, which may be incorporated into the locking device in order to provide a flexible, fluid-impermeable apron to protect paint or other fluid-sensitive materials about the tank neck 44 from the contents of the tank, e.g., gasoline. While the apron 18 is illustrated as having a generally hexagonal shape, clearly other shapes may be used. More particularly the apron 18 defines a flexible sheet 49 having an aperture 50 therethrough, the sheet 49 being adapted to be fitted over the tank neck 44 (when the tank cap 42 is removed therefrom) so that the tank neck extends through the aperture 50 (after which the tank cap 42 may be reapplied). The aperture 50 is typically disposed towards the back of the sheet 49, while the forward portion 52 of the sheet 49 is removably positionable due to its flexible nature between a storage position adjacent to the tank neck 44 and a protecting position overlying an area remote from the tank neck 44 and requiring protection from the fluid contents of the tank. In other words, the flexible apron may be folded or rolled up so as to fit within the available space surrounding the tank neck when it is not required, but extended or unrolled so as to cover or overlie an area remote from the tank neck, for example, a portion of the car finish adjacent to the car tank and in need of protection from gas during filling of the car. The apron 18 is illustrated in FIG. 10 with the forward portion 52 thereof being in a rolled up or storage position and with the rear portion thereof underlying the collar parts 30, 32 about the tank neck 44. The locking device prevents theft of the apron 18 just as it prevents removal of the tank cap 42.

To summarize, the locking device of the present invention can accommodate itself to the cramped compartment typically available about a tank neck because the cup-like body member may be seated upon the tank neck or cap with the cup-like member being axially offset from the tank neck or cap. Furthermore, the present invention provides a simple, strong, safe and inexpensive locking device which is efficient, long lasting and easy to operate.

The preferred embodiments of the present invention having been shown and described in detail, various modifications and improvements thereon will now become readily apparent to those skilled in the art. Accordingly, the spirit and scope of the present invention is to be limited only by the appended claims, and not by the foregoing disclosure.

I claim:

1. A locking device for locking a cap upon the filling neck of a tank comprising:
   (A) a generally cylindrical cup-like body member; and
   (B) a pair of inwardly extending collar parts, the ends of the collar parts being disposed in an overlying relationship, a first end of each of said collar parts being independently pivotally secured to a peripheral portion of said body member and the second ends of each of said collar parts being apertured and movable relative to each other and said body member between enabling and locking positions, said collar parts in said enabling position enabling the inwardly extending portions of said collar parts to bypass the tank cap as the device is installed or removed and in said locking position underlying the peripheral portion of the tank cap to prevent removal of the device, said body member and said collar parts being cooperable with a securing means for lockably securing said body member and said collar parts against movement;
   said body member and collar parts being capable of assuming first and second locking positions, and said body member and tank cap being axially aligned in said first locking position and axially offset in said second locking position.

2. The locking device of claim 1 wherein said body member has diametrically opposed first and second peripheral apertures and each of said collar parts has first and second apertures at said first and second ends thereof, respectively; said locking device further comprising pivot means extending through each of said first apertures of said body member and collar parts to pivotally secure said body member and said collar parts together, said body member and said second ends of said collar parts being cooperable with the securing means for lockably securing the same against movement by having a shackle portion of the securing means passing through said second apertures of said body member and collar parts.

3. The locking device of claim 2 wherein said second ends of said collar parts define three of said second apertures, whereby when one of the second apertures of each of the collar part second ends align with said body member second aperture, said body member may be axially offset from the tank cap while covering same.

4. The locking device of claim 3 wherein said collar part second apertures and said body member second aperture are capable of assuming at least six different locking positions, said body member and the tank cap being axially aligned in two of said locking positions and axially offset in four of said locking positions.

5. The locking device of claim 2 wherein said secured ends of each of said collar parts define a plurality of second apertures, whereby when one of the second apertures of each of said second ends is aligned with said body member second aperture, said body member may be axially offset from the tank cap while still covering same.

6. The locking device of claim 1 wherein said collar parts and body member are rotatable about a common axis.

7. The locking device of claim 1 further comprising the securing means.

8. The locking device of claim 1 further comprising a flexible, fluid-impermeable apron having an aperture therethrough, said apron being adapted to be fitted over the tank neck with the tank neck extending through said apron aperture, a portion of said apron being removably positionable between a storage position adjacent to the tank neck and a protecting position overlying an area remote from the tank neck and requiring protection from the fluid contents of the tank.

* * * * *